(12) United States Patent
Gregori et al.

(10) Patent No.: US 8,983,757 B2
(45) Date of Patent: Mar. 17, 2015

(54) METHOD FOR INFORMNG THE DRIVER OF A VEHICLE PROVIDED WITH A SYSTEM FOR AUTOMATICALLY STOPPING AND RESTARTING THE ENGINE IN THE EVENT AN AUTOMATIC STOP IS UNAVAILABLE

(75) Inventors: Fabrice Gregori, Fontenay aux Roses (FR); Tony Reveille, Les Ulis (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 357 days.

(21) Appl. No.: 13/520,518

(22) PCT Filed: Dec. 15, 2010

(86) PCT No.: PCT/FR2010/052745
§ 371 (c)(1),
(2), (4) Date: Jul. 3, 2012

(87) PCT Pub. No.: WO2011/086260
PCT Pub. Date: Jul. 21, 2011

(65) Prior Publication Data
US 2012/0283935 A1 Nov. 8, 2012

(30) Foreign Application Priority Data
Jan. 12, 2010 (FR) ...................................... 10 50170

(51) Int. Cl.
G06F 19/00 (2011.01)
B60W 50/08 (2012.01)
B60W 50/14 (2012.01)
F02D 17/04 (2006.01)
F02N 11/08 (2006.01)
B60W 10/06 (2006.01)

(52) U.S. Cl.
CPC ............. B60W 50/087 (2013.01); B60W 50/14 (2013.01); F02D 17/04 (2013.01); F02N 11/0818 (2013.01); B60W 10/06 (2013.01); F02N 11/0822 (2013.01); F02N 11/084 (2013.01); Y02T 10/48 (2013.01)

USPC ...... 701/112; 701/113; 123/179.1; 180/65.21

(58) Field of Classification Search
CPC .............................. F01D 41/042; F01D 41/062
USPC .............. 701/112, 113, 22; 123/179.1, 179.4, 123/179.14, 491; 180/65.21
See application file for complete search history.

(56) References Cited

U.S. PATENT DOCUMENTS

| 2002/0096137 A1 | 7/2002 | Kobayashi |
| 2004/0029677 A1 | 2/2004 | Mori |
| 2006/0212212 A1* | 9/2006 | Akasaka ........................ 701/112 |
| 2007/0267238 A1* | 11/2007 | Guy et al. ..................... 180/272 |
| 2010/0063662 A1* | 3/2010 | Harada et al. ................... 701/22 |

FOREIGN PATENT DOCUMENTS

| EP | 0952036 | A2 | 10/1999 |
| EP | 1469195 | A1 | 10/2004 |
| EP | 1612408 | A1 | 1/2006 |
| JP | 9068064 | A | 3/1997 |
| WO | 9415808 | A1 | 7/1994 |

OTHER PUBLICATIONS

International Search Report corresponding to International Application No. PCT/FR2010/052745 mailed Apr. 29, 2011.

* cited by examiner

*Primary Examiner* — John Kwon
(74) *Attorney, Agent, or Firm* — Polster, Lieder, Woodruff & Lucchesi, L.C.

(57) ABSTRACT

The invention relates to a method for informing, in a reassuring manner, the driver of a vehicle that is provided with a heat engine and a STT System for automatically stopping and restarting the engine. The method comprises the following steps: verifying that the driver requested the automatic engine stop; determining that the vehicle System does or does not allow the automatic stop; and if the automatic stop was properly requested and the vehicle System does not allow the automatic stop, informing the driver that not automatically stopping the engine is a normal opération.

10 Claims, No Drawings

METHOD FOR INFORMNG THE DRIVER OF A VEHICLE PROVIDED WITH A SYSTEM FOR AUTOMATICALLY STOPPING AND RESTARTING THE ENGINE IN THE EVENT AN AUTOMATIC STOP IS UNAVAILABLE

CROSS-REFERENCE TO RELATED APPLICATIONS

This application is the U.S. National Stage under 36 U.S.C. §371 of International App. No. PCT/FR2010/052745 filed Dec. 15, 2010, and which claims the priority of French application 1050170 filed on Jan. 12, 2010, the content of which (text, drawings and claims) is incorporated here by reference.

BACKGROUND

The present invention relates to a method for informing the driver of a vehicle equipped with a combustion engine and an automatic start and stop system of the engine, that the unavailability of the automatic stop of the engine is a normal occurrence and no reason of concern for the driver. The information provided by implementation of the method is therefore reassuring for the driver.

Automatic start and stop systems of the combustion engine in vehicles are becoming more and more common. These systems, often designated by the acronym STT or by the English expression Stop & Start System, reduce fuel consumption and therefore polluting emissions, such as carbon dioxide emissions. In the text below, the term STT system applies to any automatic stop and start system of the combustion engine of a vehicle, which can be a hybrid type of vehicle or not.

The operation of vehicles equipped with an STT system requires two things: on the one hand, a request from the driver and, on the other hand, an authorization for the vehicle to enter into an automatic stop phase of the engine. Under certain constraints, (for instance low energy level of the vehicle, need for the powertrain group, need for protection or thermal regulation), the "vehicle system" can prohibit the automatic stop of the engine. The term "vehicle system" designates all of the normal control systems operating the elements of the vehicle, such as for instance the brakes, the engine, the transmission, the servo steering, the battery charge, the ABS and ESP safety systems. It involves therefore functional monitoring.

The operation of STT systems requires for instance sufficient means for restarting the combustion engine. If a battery is used to actuate the starter, the capacity and charge of the battery must be sufficient. One solution consists in increasing the capacity of the battery, but at the detriment of cost and occupied space. According to another solution, the battery charge is checked before every automatic stop of the engine in order to ensure that the battery charge is sufficient for the automatic restart of the engine. If this is not the case, the engine is not automatically stopped. However, this functionality can be misleading for the driver because he is expecting an engine stop under certain circumstances, for instance when stopping at a traffic light. In addition, some elements of the vehicles, such as the headlights, the radio or the climate control, consume electrical energy and, if the battery is insufficiently charged, the automatic restart of the engine could be problematic, or even impossible. It may be necessary then to prohibit the automatic stop of the engine, in order to maintain sufficient battery charge. This temporary unavailability of the automatic stop of the engine, unknown to the driver, can surprise and concern him.

BRIEF SUMMARY

The disclosed system warns the driver by sending him reassuring information, after checking certain conditions. In other words, disregarding his request to stop the engine, the driver is warned of the unavailability of the automatic stop function, when the "vehicle system' is not authorizing a stop, for instance as a function of safety requirements and/or other functionalities provided by the vehicle (such as the climate control of the cabin for instance).

Partial solutions have already been proposed. For instance, U.S. Pat. No. 4,555,006 describes an SST system with a device which warns the driver by means of a light indicator that the engine is stopped.

Patent application EP 1077149 B1 describes an STT system provided with an alarm which is triggered to indicate to the driver that the engine is stopped. It also proposes informing the driver of the restart of the engine when the driver releases the clutch pedal.

U.S. Pat. No. 4,481,425 describes an STT system comprising a warning light informing the driver that the system is running or stopped.

These documents do not describe a method for reassuring the driver that the absence of an automatic engine stop is not a failure of the STT system but that it corresponds with normal operation, although the driver is expecting the STT system to provide an automatic stop of the combustion engine.

More precisely, a method is provided for supplying reassuring information to the driver of a vehicle equipped with a combustion engine and with an automatic stop and start (SST) system of the engine, whereby the method comprises the following steps: verification that the driver has requested the automatic stop of the engine, determining whether the vehicle system authorizes or prohibits the automatic stop, and if the automatic stop is indeed requested and if the vehicle system prohibits the automatic stop, warning the driver that the absence of the automatic engine stop is a normal operating condition.

The warning of the driver can take the form of light and/or sound information, for instance lighting of an indicator, displaying a message or a symbol on the dashboard or on a specific screen.

The verification that the driver has indeed requested the automatic stop can include the following steps: the engine stop request by the client is confirmed by the STT system, and the STT function is activated and the engine is not stopped.

The determination whether the vehicle system authorizes or prohibits the engine stop can be made by ensuring that the engine stop can be performed in safe conditions while preserving the functionalities offered by the vehicle (for instance by verifying the state of the brakes, the servo steering, the ABS and/or ESP system and the vehicle suspension).

Whether the system authorizes or prohibits the stop of the combustion engine of the vehicle is determined, for instance, through at least one of the following verification steps:

i. the presence of the driver in the cabin (for instance, determine whether the safety belt of the driver is open or closed and/or whether the driver side door is open or closed), or ii. the state of the climate control system of the cabin (for instance, whether the climate control system is converging towards a temperature requested by an occupant of the vehicle), or iii. the state of the powertrain group, including the engine itself and the transmission, or iv. the state of the vacuum in the brake system in order to preserve the quality of braking, (for instance, comparison of the vacuum level in the brake system with a predetermined threshold and if the vacuum level is lower than the threshold, the automatic engine stop is not authorized), or v. the state of the electrical supply and energy management system, which can involve at least the charge state of the battery of the vehicle, whereby the automatic engine stop is prohibited if the charge is lower than a predetermined threshold, or vi. the position of the gear shift lever, whereby the Reverse position prohibits the automatic engine stop, or vii. the speed achieved by the vehicle after disengaging the electric parking brake or after starting the engine by means of the ignition key (the term "ignition key" includes any other means such as a push button or a card), or viii. the closed state of the engine compartment cover, whereby the automatic engine stop authorization is not given if the engine compartment cover is not closed.

The warning of the driver can comprise information specifying that the unavailability of the automatic stop of the combustion engine could be terminated after a specific time interval of approximately a few seconds.

According to an advantageous embodiment, the warning of the driver is stopped if the driver interrupts his request for automatic engine stop. For instance, in the case of a vehicle equipped with an electronically controlled manual transmission or with an automatic transmission, the warning can be interrupted if the driver releases the brake pedal and if the transmission shift lever is in Auto or Drive, or, in case the vehicle is equipped with a manual transmission, if the driver depresses the clutch pedal.

The warning of the driver can also be suppressed if the engine stop request from the driver is valid and if the engine stop prohibition by the vehicle system is terminated, or if the STT function changes from active to inactive state.

Other advantages and characteristics of the invention will become clear during the following description of an implementation mode of the invention, given as non-limiting example.

DETAILED DESCRIPTION

According to one embodiment of the invention, the driver is informed by a specific information (visual and/or sound) of the unavailability of the automatic engine stop phase of the STT system after requesting a stop phase, if the client has requested the automatic stop of the engine, which can be translated into the following conditions 1 to 3:

1. the request by the driver to enter into a stop phase is confirmed or, in case of a transitory situation, the request to enter into a stop phase changes from unconfirmed to confirmed, and 2. the STT function is in an active state (the driver presses a pushbutton on the dashboard for inhibiting or activating the STT system, whereby the driver is only warned if the STT function is activated), and 3. the combustion engine is running In addition, the driver is warned by means of a reassuring message of the unavailability of the stop phase, only if the transition to automatic stop phase is not authorized by the vehicle system. This condition regroups the authorizations expected by the vehicle in order to ensure a safe automatic stop and the functionalities provided by the vehicle. This condition can be broken down in several sub-conditions of authorizations which can have different origins, such as, these non-exhaustive examples:

a. the presence of the driver is not confirmed (for instance, the safety belt of the driver is not buckled or the driver side door is open), b. the ground connection system does not allow the automatic stop, the authorization refusal can originate from, for instance, the ABS or ESP system, the servo steering, the suspension, for instance, hydrodynamic or pneumatic type suspension, or the electric parking brake, if the brake is applied, the automatic stop of the combustion engine is not authorized, c. the thermal system of the cabin in the case of converging temperature, d. a powertrain group which regroups the engine itself and the transmission, whereby the authorization can be refused in order to protect the control devices and/or to for reasons of pollution, e. the brake system: if the vacuum level in the system is lower than a predetermined threshold, the combustion engine must continue to run in order to drive the vacuum pump of the brake system and to guarantee its effectiveness, f. the electric supply and energy management system of the vehicle: for instance, if the battery charge is insufficient, the vehicle system will not authorize the automatic engine stop because the engine may not be able to restart, or will start only with great difficulty, g. the transmission control system: if the shift lever is in Reverse position, the automatic engine stop will not occur.

h. the speed of the vehicle: the automatic engine stop is only authorized if the vehicle speed is lower than a predetermined threshold, i. The speed of the vehicle after starting the combustion engine by means of the ignition key or a start pushbutton or a start card: if the vehicle speed is lower than a predetermined threshold after the start of the engine, the automatic engine stop is not authorized.

j. the not-closed state of the hood of the vehicle: if the hood is open, the automatic engine stop is not authorized when the engine compartment hood is not closed so that the engine compartment can be accessed under safe conditions.

In certain circumstances, the automatic stop can be delayed in time and it is then appropriate to inform the driver that his request for automatic stop of the engine could be taken into account if the vehicle system authorizes the stop within a predetermined time interval, for instance a few seconds (less than 5 seconds for instance). A time delayed stop is then obtained.

The specific information to warn the driver that the stop phase of the engine is unavailable should stop under certain conditions. That is, under certain conditions, the driver should not be warned of the unavailability of the automatic start and stop (SST) system.

The interruption or unavailability of the SST system can be triggered if the driver is no longer requesting the automatic stop (it is therefore no longer necessary to inform the driver of the unavailability of the automatic stop!), which can occur when the driver releases the brake pedal while the shift lever is in the Auto position and the transmission is an electronically controlled manual transmission or an automatic transmission, or when the driver depresses the clutch pedal and the vehicle is equipped with a manual transmission.

This interruption will also occur if the driver has requested the automatic engine stop and the vehicle system, which initially had refused the authorization, is now authorizing it (delayed stop).

The unavailability of the SST system can also occur if the STT function changes from active state to inactive state.

With the present invention, the driver is informed that the prohibition of the automatic stop phase, in spite of the stop request, is a normal situation which corresponds with correct functioning of the vehicle. This information reassures the driver and facilitates the operation of a vehicle equipped with a STT system.

Other embodiments than those described and represented can be conceived by a person skilled in the art without exceeding the scope of the present invention.

The invention claimed is:

1. A method of providing reassuring information to the driver of a vehicle equipped with a combustion engine and an automatic engine stop and start system (STT system) the SST system providing an SST function, whereby the method comprises the steps of verifying that the driver has requested an automatic engine stop, determining whether the vehicle system authorizes or prohibits the automatic engine stop and, if the automatic stop was indeed requested and the vehicle system prohibits the automatic stop, warning the driver that the absence of the automatic engine stop is a normal functional event.

2. The method according to claim 1 characterized in that the warning of the driver is in the form of a light and/or sound signal.

3. The method according to claim 1, characterized in that the the step of verifying that the driver has requested the automatic stop comprises the following steps: the engine stop request is confirmed by the STT system, and the STT function is activated, and the engine is not stopped.

4. The method according to claim 1, characterized in that the step of determining that the vehicle system is authorizing or prohibiting the stop of the engine comprises ensuring that the engine stop can be performed under safe conditions while maintaining the functionalities offered by the vehicle, by verifying at least one of the following:

the presence of the driver in a cabin of the vehicle, or
the state of a thermal system of the cabin, or
the state of a powertrain group including the engine and the transmission, or
the state of a vacuum in the brake system, or
the state of an electrical supply and energy management system, or
the position of a shift lever, whereby if the shift lever is in a Reverse position, the automatic engine stop is prohibited, or
the speed reached by the vehicle after releasing an electric parking brake or after starting the engine, or
the open state of an engine compartment hood.

5. The method according to claim 4, characterized in that said vehicle system comprises at least one of the following: a parking brake, the a servo steering, an ABS and/or ESP system, or a suspension.

6. The method according to claim 4, characterized in that verifying the state of the thermal state of the cabin comprises determining whether the climate control unit is in a run or stop mode, whereby in certain cases of converging cabin temperature the run mode of the climate control system can prohibit the automatic stop of the combustion engine.

7. The method according to claim 4, characterized in that verifying the state of the vacuum in the brake system comprises comparing a vacuum level in the brake system with a predetermined threshold and if said vacuum level is lower than said threshold the automatic stop of the combustion engine is not authorized.

8. The method according to claim 4, characterized in that verifying the state of the electrical supply and energy management system involves at least verifying a charge state of the vehicle battery, whereby the automatic stop of the engine is prohibited if said charge state is lower than a predetermined threshold.

9. The method according to claim 1, characterized in that said warning of the driver comprises information specifying that the unavailability of the automatic stop of the combustion engine could be terminated after a specific time interval.

10. The method according to claim 1, characterized in that said warning of the driver is terminated if the driver interrupts the automatic engine stop request, or if the STT function changes form an active state to an inactive state, or if the engine stop request by the driver is valid and the prohibition of the engine stop by the vehicle system is terminated.

* * * * *